United States Patent [19]
Tanihata et al.

[11] 3,827,127
[45] Aug. 6, 1974

[54] TIRE VALVE CORE MOUNTING APPARATUS

[75] Inventors: Akio Tanihata; Norio Abe, both of Tokyo, Japan

[73] Assignee: Bridgestone Tire Company Limited, Tokyo, Japan

[22] Filed: Oct. 30, 1973

[21] Appl. No.: 411,072

[30] Foreign Application Priority Data
Nov. 8, 1972   Japan.............................. 47-111949

[52] U.S. Cl. ................ 29/240, 29/208 F, 29/221.5
[51] Int. Cl............................................ B23p 19/04
[58] Field of Search ... 29/240, 208 F, 208 R, 221.5, 29/33 N

[56] References Cited
UNITED STATES PATENTS
1,482,687   2/1924   Kraft................................. 29/33.11
3,208,133   9/1965   Morton........................ 29/221.5 X Primary Examiner—James L. Jones, Jr.
Attorney, Agent, or Firm—Eric H. Waters

[57] ABSTRACT

Herein disclosed is a tire valve core mounting apparatus for mounting one or more valve cores into one or more valve stems. The tire valve core mounting apparatus comprises an annular member adapted to be intermittently rotated through a constant angle and having therein a plurality of valve stem holding bores being in circumferentially equidistant relation with respect to one another, each valve stem holding bore extending radially of the annular member, and a plurality of locking mechanisms mounted on the annular member for locking the valve stem in the valve stem holding bores, a valve core supplying and screwing arrangement fixed with respect to the annular member for supplying a valve core to a valve stem held in one of the valve stem holding bores per an angle of rotation of the annular member and for screwing the valve core into the valve stem, and disengaging means fixed with respect to the annular member and spaced in the rotation direction of the annular member from the valve core supplying and screwing arrangement for disengaging the valve stem from the valve stem holding bore.

10 Claims, 9 Drawing Figures

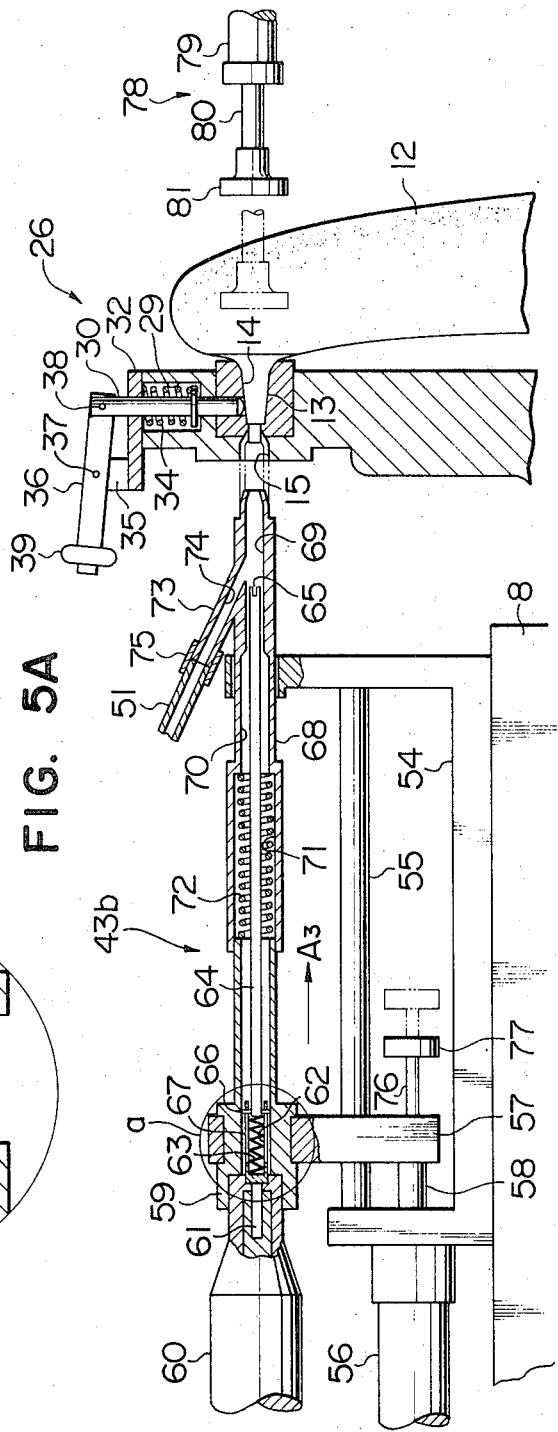
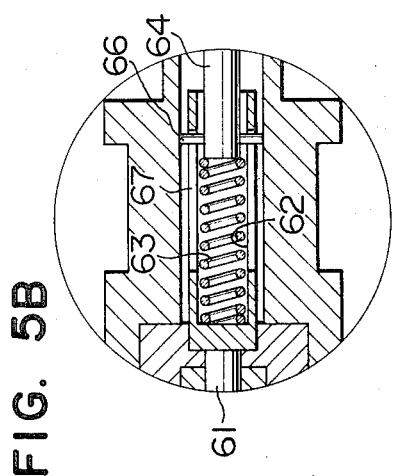
FIG. 5A
FIG. 5B

TIRE VALVE CORE MOUNTING APPARATUS

The present invention relates in general to the art of pneumatic tire manufacture and in particular is concerned with a valve core mounting apparatus for automatically mounting the valve cores in the valve stems for tire.

As is well known in the art, the tire valve through which air is supplied to the pneumatic tire is generally comprised of a valve stem usually mounted on an inner tube and a valve core, or inside core, accommodated in the valve stem. Since, heretofore, the process of mounting the valve core in the valve stem has been performed by manual trades, difficulty has been encountered in that the manual trades necessitate manual dexterity and is achieved at much low work performance efficiency. Furthermore, the manual trades results in an undesirably high proportion defective of the resultant valves.

The specific purpose of the present invention is accordingly to provide a tire valve core mounting apparatus which automatically and successively mount one or more valve cores in one or more valve stems.

According to the present invention, a tire valve core mounting apparatus is provided which comprises a fixed base member, a rotating base member adapted to be intermittently rotated through a constant angle with respect to the fixed base member, an annular member mounted on the rotating base member and having a plurality of valve stem holding bores being in circumferentially equidistant relation with respect to one another, each valve stem holding bore extending radially of said annular member, a plurality of locking mechanisms mounted on said annular member for preventing the valve stem held in one of said valve stem holding bores from loosing from said one of the valve stem holding bores, each locking mechanism being associated with each valve stem holding bore valve core supplying and screwing means mounted on the fixed base member for supplying a valve core to the valve stem per an angle of rotation of said annular member and for screwing said valve core into said valve stem, and first disengaging means mounted on the fixed base member and spaced in the rotation direction of said rotating base member from said valve core supplying and screwing means, for disengaging said valve stem from said one of the valve stem holding bores.

For a full understanding of the invention, a detailed description in a preferred form will now be given in connection with the accompanying drawings and the features forming the invention will be specifically pointed out in the claims.

In the drawings:

FIG. 5A is a sectional view of the apparatus of FIG. 1 taken along the line C—C;

FIG. 5B is a view showing in detail a portion encircled by a circle $a$ shown in FIG. 5A;

Like reference numerals designate like or corresponding parts in the views.

Figure 1:
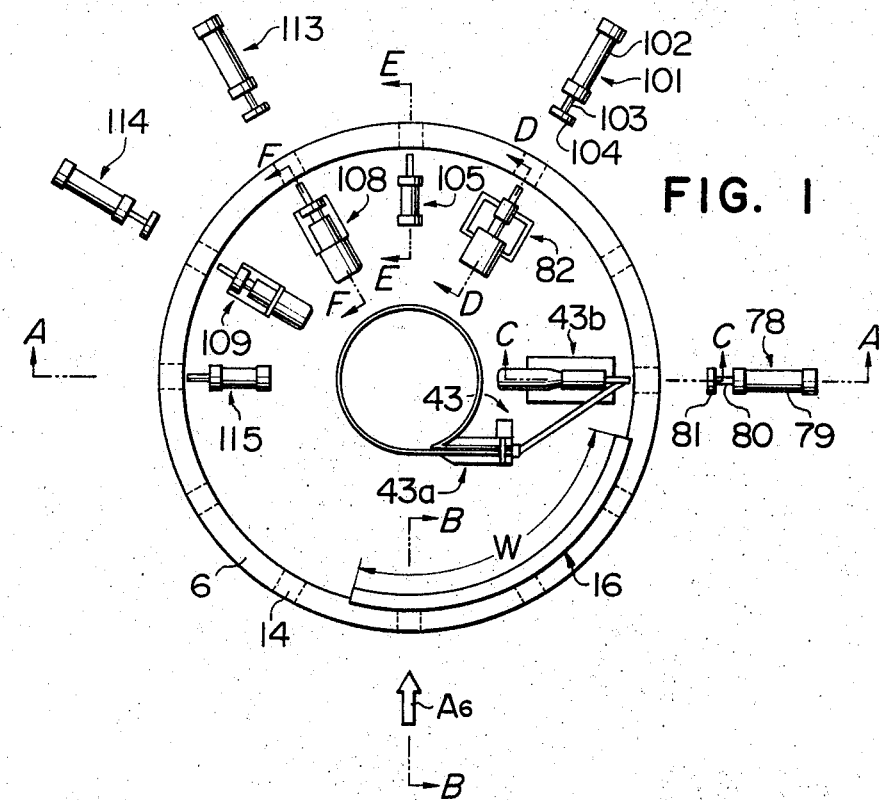
FIG. 1 is a schematic view of a tire valve core mounting apparatus according to the present invention.
Figure 2:
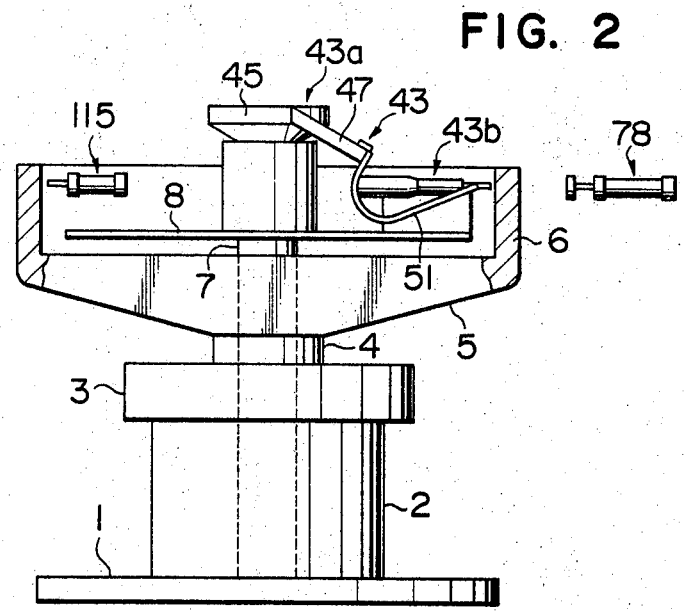
FIG. 2 is a longitudinal section of the tire valve core mounting apparatus of FIG. 1 taken along the line A—A.

Referring now to the drawings and more specifically to FIGS. 1 and 2 thereof, there is shown a tire valve core mounting apparatus according to the invention which comprises a fixed base member. On the base member 1 is mounted a drive system 2 which includes a bearing 3. A rotary tubular shaft 4 is journaled on the bearing 3 and arranged to be rotated by the drive system 2. A rotating base member 5 having a central bore is so mounted on the rotary tubular shaft 4 that the bore of the rotating base member 5 is in alignment with the bore of the tubular shaft 4. The rotating base member 5 is, in this case, integral with an annular member 6 which has a plurality of valve stem holding bores radially extending therethrough and being circumferentially equidistant from one another. A fixed column 7 is confirmly fixed on the base member 1 and passing through the rotary tubular shaft 4 without engaging with the drive system 2. A circular plate 8 is mounted on the top end of the fixed column 7.

Figure 3:
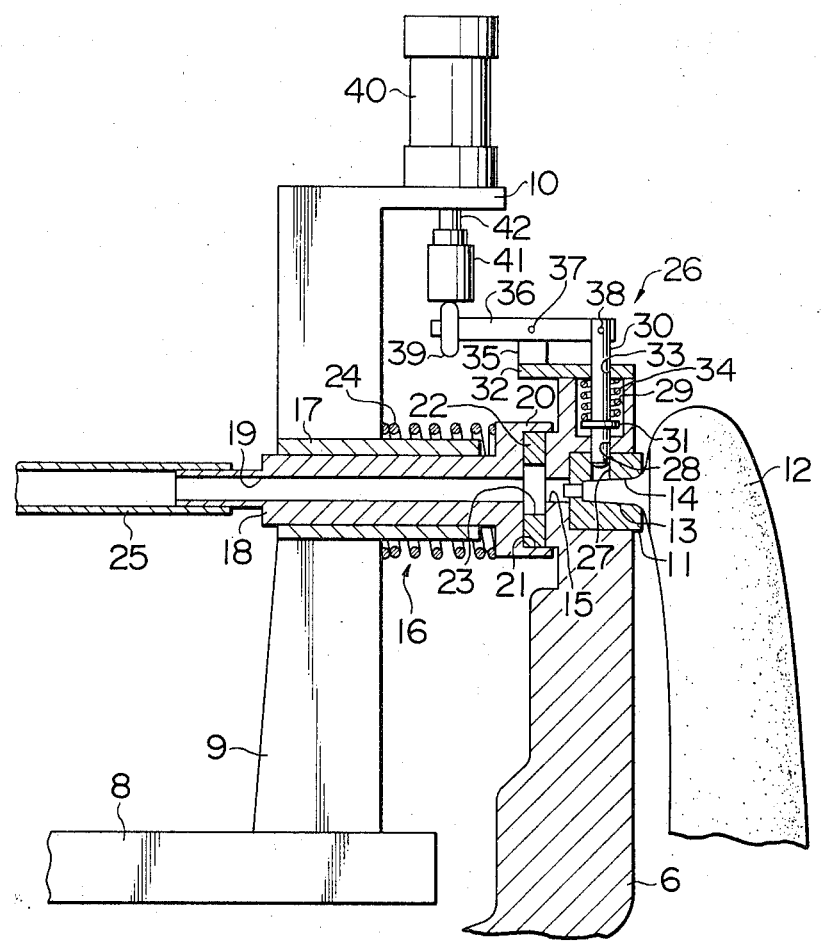
FIG. 3 is a sectional view taken along the line B—B shown in FIG. 1.

In FIG. 3, a reference numeral 9 designates a support column which is fastened on the circular plate 8 and has at its top end a protrusion 10. Each valve stem holding bore 14 is so formed that a valve stem 13 is snugly inserted into it. In this case, the valve stem holding bore 14 is formed in each of holding members 11 embedded in the annular member 6. The valve stem 13 is, in this case, mounted on an inner tube 12. The valve stem holding bore 14 communicates with a bore 15 opened at the inner surface of the annular member 6. A suction mechanism 16 is fastened on the column 9, which includes a sleeve 17 mounted on an intermediate portion of the column 9 and directed radially of the annular member 6. Into the sleeve 17 is inserted a suction hollow member 18 which has a bore 19 therein and is formed into an enlarged arcuate end portion 20. The arcuate end portion 20 of the suction hollow member 18 has a width W as clear clearly shown in FIG. 1. A recess 21 is formed on the periphery of the arcuate end portion 20, which receives a seal metal 22 having therein a circumferentially elongated slot 23. A spring 24 is interposed between the column 9 and the enlarged arcuate end portion 20 for urging the suction hollow member 18 outwardly radially of the annular member 6 so that the seal member 22 is fitted onto the inner surface of the annular member 6, whereby a sealed passageway is formed by the bore 15, the elongated slot 23 and the bore 19. The passageway communicates by way of a tube 25 to a suction pump (not shown), so that air contained by the inner tube 12 is removed from the tube 12 by way of the passageway. A locking mechanism 26 is mounted on the annular member 6, which includes a locking rod 30 having a flange portion 31. In the holding member 11 is formed an axially subsidiary extending bore 27 which communicates with the valve holding bore 14. An axially extending bore 29 is formed in the annular member 6, which communicates through an axially extending bore 28 with the bore 27 and shut by a cover plate 32 with a bore 33. The locking rod 30 is inserted into the bores 27, 28, 29 and 30. A spring 34 is provided between the flange portion 31 and the cover plate 32 so as to urge the locking rod 30 toward the valve stem holding bore 14. A lever 36 is pivotted at its intermediate portion by a pin 37 on a bracket 35 which is fastened on the cover plate 32 and at one end portion by a pin 38 on the rod 30. A roller 39 is rotatably mounted on the other end portion of the lever 36. A fluid operated cylinder 40 is fastened on the protrusion 10, having a piston rod 42. A cam 41 is mounted on an end portion of the piston rod 42. With the above-stated arrangement, when the roller 39 comes into engagement with the cam 41 through the rotation of the annular member 6, the roller 39 is pushed down and the rod 30 is lifted as shown in this figure, so that the valve stem 13 is released from the locking of the rod 30. When, the annular member 6 is further rotated, the roller 39 is disengaged from the cam 41 so that the rod 30 is moved down by the spring force of the spring 34 thereby to lock the valve stem 13. When it is intended to replace the holding member 11 by another one, the roller 39 is further moved down by the action of the cylinder 40.

Turning back to FIG. 1, the tire valve core mounting apparatus of the invention further comprises a valve core supplying and screwing mechanism 43 which is mounted on the circular plate 8 at a position distant from the suction mechanism 16 in the rotation direction of the annular member 6. The valve core supplying and screwing mechanism 43 includes a valve core supplying mechanism 43a and a valve core screwing mechanism 43b.

Figure 4:
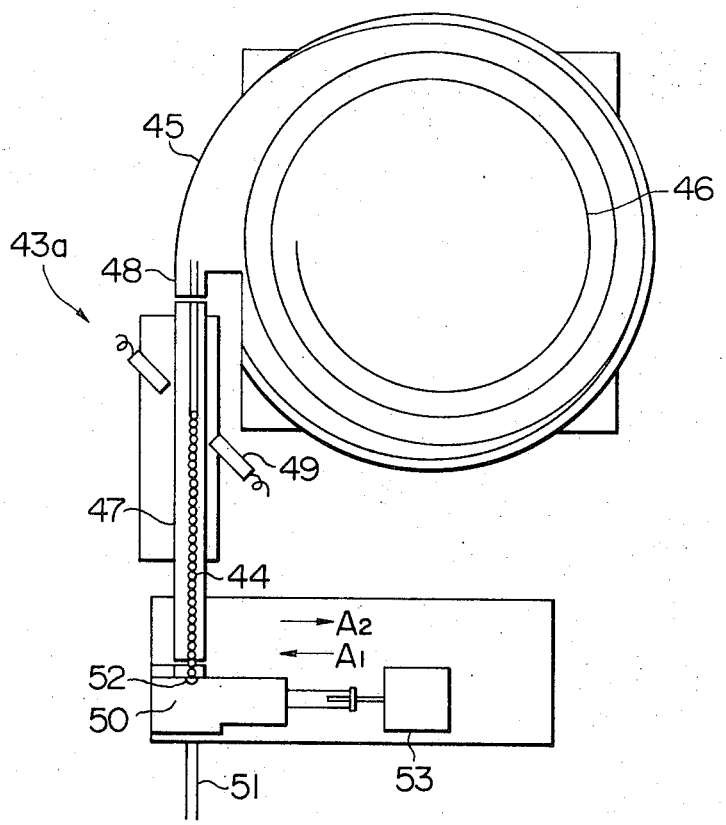
FIG. 4 is a diagram showing in an enlarged scale a valve core feeder of the apparatus of FIG. 1.

In FIG. 4, there is diagrammatically shown the valve core supplying mechanism 43a which includes a valve core feeder 45 for storing a number of valve cores and feeding the valve cores through a guide passage 46 and an outlet 48 to a shooter 47. A shutter 50 is provided for intermittently communicating the shooter 47 and a feed tube 51 by way of a bore 52 formed therein. The shutter 50 is receiprocated by an actuator 53 as indicated by arrows $A_1$ and $A_2$. A desired amount of valve cores 44 are accumulated in the shooter 47 through the operation of a photo-detecting arrangement 49.

In FIGS. 5A and 5B, there is shown the valve core screwing mechanism 43b which includes a bracket 54 mounted on the circular plate 8. A stationary rod 55 is secured to the bracket 54. A fluid operated cylinder 56 is fastened on a portion of the bracket 54 radially inward of the circular plate 8. A slide member 57 is slidably mounted on the stationary rod 55 and is connected to an end of a piston rod 58 of the cylinder 56. A sleeve 59 is mounted on the slide member 57. An air motor 60 is secured on a radially inward side wall of the sleeve 59, which has a rotary shaft 61 inserted into the sleeve 59. The rotary shaft 61 has at its end portion a bore 62 and a pair of axially elongated slots 67. A screw drive bit 64 having a radially outer end 65 so formed as to be capable of engaging with a valve core mounted in the valve stem 13 held in the bore 14 is accommodated in the sleeve 59. A radially inner end of the bit 64 is inserted into the bore 62. A pair of pins 66 is mounted on the periphery of the radially inner end of the bit 64 and inserted into the elongated slots 67 so that the bit 64 is movable axially with respect to the rotary shaft 61 against the spring force of a spring 63 accommodated in the bore 62. A bit guide tube 68 is radially slidably mounted on a radially outer side of the bracket 54. The bit guide tube 68 has a hollow 69 into which the radially outer end of the bit 64 is inserted. The hollow 69 is enlarged at an intermediate portion 70 and further enlarged at a radially inner end portion 71. A spring 72 is accommodated in the enlarged portion 71 and compressed by a radially outer end of the sleeve 59 which is inserted into the enlarged portion 71 of the hollow 69. A valve core guide tube 73 is, in this case, integral with the guide tube 68 and has a hollow 74 communicating with the hollow 69. The valve core guide tube 73 is connected by means of a connector 75 to the feed tube 51. A fluid operated cylinder (not shown) is mounted on the circular plate 8 and has a piston rod 76. A stop member 77 is mounted on the piston rod 76, for limiting the stroke of the slide member 57. A valve stem pressing mechanism 78 may be provided at an opposite side with respect to the annular member 6 so as to make assure the locking operation of the locking mechanism 26. The valve stem pressing mechanism 78 includes a fluid operated cylinder 79 which is firmly fixed on the fixed base member 1 by a suitable mechanical means (not shown). A stop member 81 is mounted on one end of the piston rod 80 of the cylinder 79. The valve stem pressing mechanism 78 can be omitted, when the locking mechanism 26 is reliable in operation.

Turning back to FIG. 1, it will be seen that the tire valve core mounting apparatus of the invention further comprises detecting mechanism 82 mounted on the circular plate 8 and spaced from the valve core supplying and screwing mechanism 43 in the rotation direction of the annular member 6, for detecting whether a valve core is correctly mounted in a valve stem by the valve core supplying and screwing mechanism 43.

Figure 6:
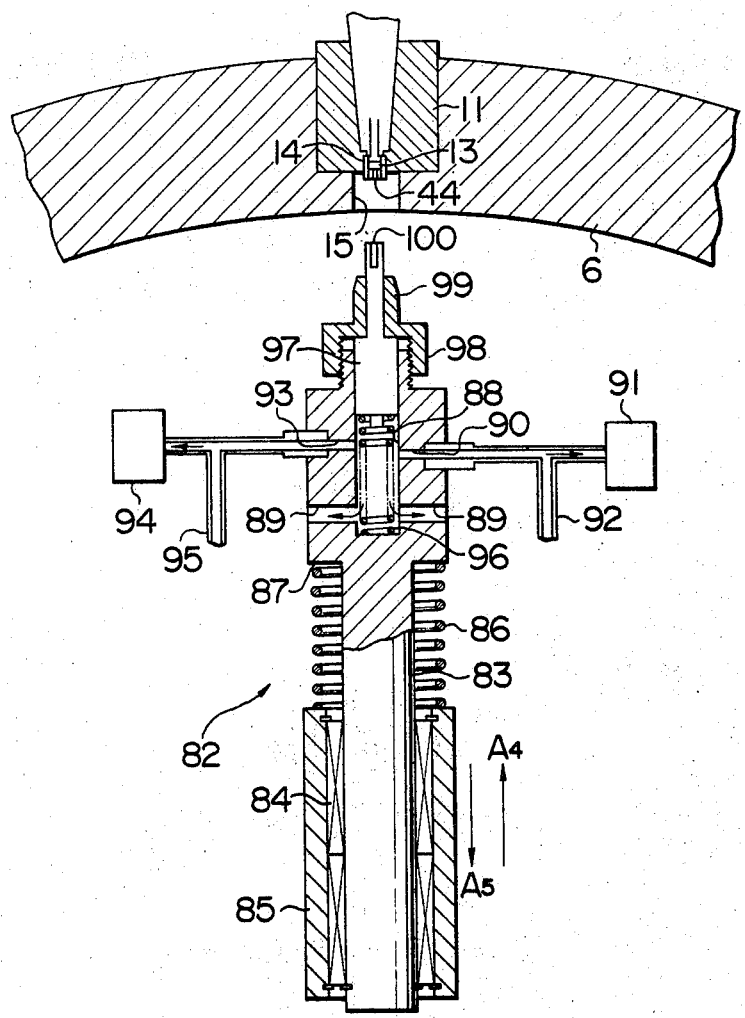
FIG. 6 is a sectional view of the apparatus of FIG. 1 taken along the line D—D.

As clearly shown in FIG. 6, the detecting mechanism 82 includes a movable rod 83 which is slidably coupled at one end thereof by way of a bearing 84 on an outer cylinder 85. The outer cylinder 85 is so mounted on the circular plate 8 as to be reciprocal as indicated by arrows $A_4$ and $A_5$. The movable rod 83 has the other end portion 87 thereof enlarged and urged toward the annular member 6 by a spring 86 interposed between the enlarged end portion 87 and the outer cylinder 85. The movable rod 83 has at the other end portion 87 thereof an axially extending bore 88 with one open end and one or more radially extending bore 89 establishing communication between the bottom portion of the bore 88 and the atmosphere. The movable rod 83 further has at the end portion 87 a radially extending bore 90 communicating with the bore 88. A pipe 92 connected to a compressed air source (not shown) establishes communication between the bore 90 and a pressure switch 91. The pressure switch 91 actuates when compressed air is applied thereto through the pipe 92. The movable rod 83 further has at the end portion 87 a radially extending bore 93 communicating with the bore 88 and being spaced from the bore 90 in the axial direction of the movable rod 83. A pipe 95 extending from a compressed air source (not shown) establishes communication between the bore 93 and a pressure switch 94. The pressure switch 94 actuates when compressed air is applied thereto through the pipe 95. A cap member 98 is mounted by way of, for example, a screw on the end portion 87 and has an axially extending bore into which a thin end portion 99 of a detecting rod 97 is inserted. The rod 97 is in turn inserted into the bore 88 and is urged by a spring 96 onto the cap member 98. The thin end portion 99 has a detecting end 100 so formed as to be capable of engaging with a valve core mounted in a valve stem held in the valve stem holding bore 14 when the cylinder 85 is moved as indicated by the arrow $A_4$. The stroke of the rod 97 is regulated by the cap member 98. The detecting mechanism 82 may further includes a valve pressing mechanism 101 so positioned as to be in alignment with the movable rod 83, as shown in FIG. 1. The valve pressing mechanism 101 has the same construction as the valve pressing mechanism 78 and includes a fluid pressure operated cylinder 102 having a piston rod 103 with a stop member 104.

Turning back to FIG. 1, the valve core mounting apparatus further comprises a disengaging mechanism 105 mounted on the circular plate 8 and spaced from the detecting mechanism 82 in the rotation direction of the annular member 6, for disengaging a valve stem from the annular member 6 when a valve core is incorrectly mounted in the valve stem.

Figure 7:
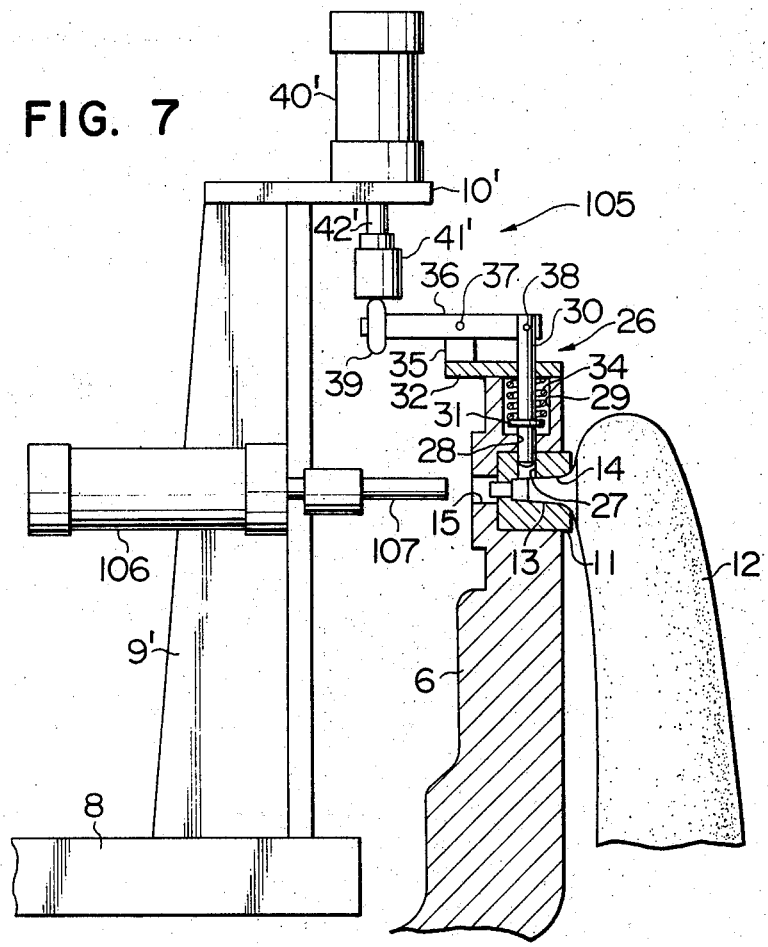
FIG. 7 is a sectional view of the apparatus of FIG. 1 taken along the line E—E.

FIG. 7 illustrates in detail the disengaging mechanism 105 which includes a column 9' fastened on the circular plate 8 and having at the top end portion a projection 10'. A fluid pressure operated cylinder 40' having piston rod 42'. A cam 41' is mounted on an end of the piston rod 42'. At an intermediate portion of the column 9' is mounted a fluid pressure operated cylinder 106 which has a piston rod 107 extending radially of the annular member 6 and being in alignment with the valve stem holding bore 14. When the roller 39 engages with the cam 41' due to the rotation of the annular member 6, the rod 30 is lifted, so that the valve stem 13 can be removed from the bore 14 when the piston rod 107 is moved to push the valve stem 13 radially outwardly.

As shown in FIG. 1, the valve core mounting apparatus further includes first and second screwing mechanisms 108 and 109 which are in order mounted on the circular plate 8 and positioned at a place spaced from the disengaging mechanism 105 in the rotation direction of the annular member 6. The screwing mechanisms 108 and 109 have identically the same construction and one of them may be omitted, if desired.

Figure 8:
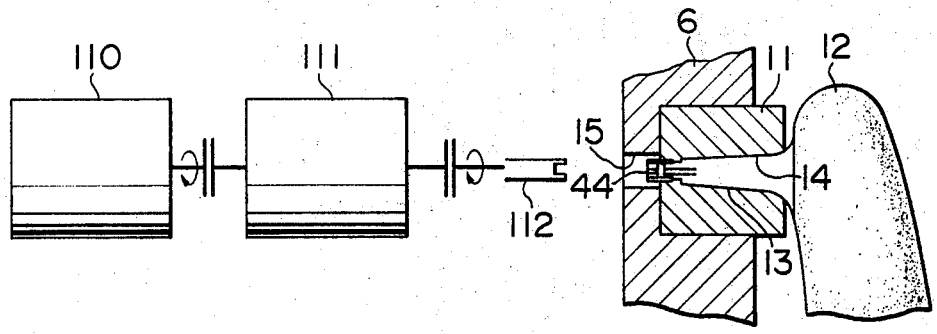
FIG. 8 is a sectional view of the apparatus of FIG. 1 taken along the line F—F.

As shown in FIG. 8, each of the screwing mechanisms 108 and 109 includes a servo motor 110 having a rotary shaft and a screw drive bit 112 connected by way of a powder clutch 111 to the rotary shaft of the servo motor 110. The screw drive bit 112 has a construction similar to the bit 64. The servo motor 110 and the powder clutch 111 are mounted on the circular plate 8 in such a manner as to be movable radially of the annular member 6. The mechanisms 108 and 109 may be so controlled that the screw drive bits 112 are driven by the same torques. However, experience shows that the valve core is desirably screwed into the valve stem when the screw drive bits 112 are driven by different torques such as 4.24 Kg.cm and 3.64 Kg.cm. The rotation speed of the servo motor 110 is, for example, 200 r.p.m. The screwing mechanisms 108 and 109 may further include respectively valve stem pressing mechanisms 113 and 114, if preferred. The mechanisms 113 and 114 have the same constructions as the mechanism 78.

As shown in FIG. 1, the valve core mounting apparatus further comprises a disengaging mechanism 115 mounted on the circular plate 8 and positioned at a place spaced from the screwing mechanism 109 in the rotation direction of the annular member 6. The disengaging mechanism 115 has identically the same construction and function as the disengaging mechanism 105.

It is now to be noted that the detecting mechanism 82, the disengaging mechanism 105, or the screwing mechanisms 108 and 109 may be omitted, if desired. When the valve core mounting apparatus is used for manufacturing valves for tubeless tires, the suction mechanism 16 may be omitted because the valve stem 13 is not mounted on the inner tube 12. Furthermore, those mechanisms mounted on the circular plate 8 are spaced from one another by distances equal to or integer times as large as the distance between the adjacent two valve stem holding bores 14.

Referring now to the drawings, the operation of the tire valve core mounting apparatus of the invention will be explained hereinbelow.

In operation, the drive system 2 intermittently rotates the annular member through a constant angle corresponding to circumferential distance between the adjacent two valve stem holding bores 14 of the annular member 6. One or more valve stems are consecutively applied to the valve stem holding bores 15 at a position indicated by an arrow $A_6$ shown in FIG. 1. It is to be noted that since the column 9 is placed at this position the locking rod 30 is lifted as shown in FIG. 3 so that the valve stems 13 readily inserted into the bores 14 and fixedly held in the bores 14 upon the subsequent rotation of the annular member 6. On the other hand, the compressed air contained in the tube 12 is removed from the tube 12 through the bores 14 and 15, slot 23, hollow 19 and the tube 25 by means of the suction pump, while the valve stem holding bores 14 communicates with the elongated slot 23 and, namely, the valve stem holding bores 14 are in the range indicated by W in FIG. 1. Since, in this instance, the hollow member 18 is urged toward the annular member 6 by the spring 24, the passageway of the compressed air is hermetically sealed.

When the annular member 6 is further rotated, the valve stem holding bore 14 holding therein the valve core 13 comes in alignment with the hollow 69 of the guide tube 68 of the valve core supplying and screwing mechanism 43. When, at this instant, the fluid pressure operated cylinder 56 is actuated, the air motor 60, sleeve 59 and guide tubes 68 and 73 are moved together as indicated by the arrow $A_3$ until the slide member 57 abuts with the stop member 77, whereby the end portion of the guide tube 68 is snugly inserted into the bore 15 as indicated by phantom lines shown in FIG. 5A. In this instance, the spring 72 act to make the end portion of the guide tube 68 to softly couple with the bore 15. The valve core supplying mechanism 43a, on the other hand, consecutively supply a plurality of valve cores by way of the feed tube 51, guide tube 73 and the hollow 69 to the valve stems 13 due to the reciprocal movement of the shutter 50 in the directions $A_1$ and $A_2$. When one of the valve cores is inserted into one of the valve stems 13, the stop member 77 is moved by actuation of the fluid operated cylinder (not shown) up to a position indicated by phantom lines shown in FIG. 5A, so that the sleeve 59 is further moved in the direction $A_3$ until the end 65 of the bit 64 engages with the valve core 44 inserted in the valve stem 13. Then the air motor 60 is driven so that the bit 64 screws the valve core into the valve stem 13 under a desired torque. During the operation of the valve core supplying mechanism 43a and the valve core screwing mechanism 43b, the valve stem pressing mechanism 78 presses the valve stem 13 radially inwardly of the annular member 6 by moving the stop member 81 to a position indicated by phantom lines shown in FIG. 5A. When the valve core is completely screwed into the valve stem, the guide tubes 68 and 73, sleeve 59 and air motor 60 are moved back to the original position by the operation of the cylinder 56 and, at the same time, the cylinder 79 is also actuated so as to return the stop member 81.

When the annular member 6 is further rotated, the valve stem holding bore 14 holding therein the valve stem 13 together with the valve core 44 comes into slignment with the detecting rod 97 of the detecting mechanism 82. At this instant, the movable rod 83 is moved in the direction $A_4$ by a predetermined distance until the end 100 of the detecting rod 97 engages with the valve core 44 screwed into the valve stem 13. When, in this instance, the valve core 44 is completely screwed into the valve stem 13, the detecting rod 97 is moved against the spring force of the spring 96 until the inner or bottom end of the detecting rod 97 locates between the bores 90 and 93 so that the communication between the axially extending bore 88 and the radially extending bore 93 is cut off and, on the other hand, the communication between the axially extending bore 88 and the radially extending bore 90 is maintained. When, in this instance, compressed air is supplied through the pipe 92 and the pipe 95, the compressed air in the pipe 92 is exhausted through the bore 89 so that the pressure switch 91 is not actuated. On the contrary, the compressed air in the pipe 95 is not exhausted and actuates the pressure switch 94. An electric circuit (not shown) is electrically connected to the pressure switches 91 and 94 for producing in accordance with the actuation of the pressure switches 91 and 94 electric signals informing whether the valve core is completely screwed into the valve stem 13. When the valve core 44 is incompletely screwed into the valve stem 13, the detecting rod 97 is moved against the spring 96 until the inner or bottom end of the rod 97 shuts both of the bores 90 and 93, whereby both of the pressure switches 91 and 94 actuate when compressed air is supplied to the pipes 92 and 95. In this instance the electric circuit produces a signal informing that the valve core 44 is incompletely screwed into the valve stem 13. When the valve core 44 is not inserted into the valve stem 13 because of, for example, erroneous operation of the valve core supplying and screwing mechanism 43, the end 100 of the detecting rod 97 is deeply inserted into the valve stem 13, so that both of the bores 90 and 93 communicates through the bores 88 and 89 to the atmosphere. In this case, both of the pressure switches 91 and 94 do not actuate even if compressed air is supplied to the pipes 92 and 95. The electric circuit then produces a signal informing that the valve core is not inserted into the valve stem. After the lapse of a predetermined time period, the movable rod 83 is moved in the direction $A_5$ by moving the outer cylinder 85. It is to be noted that the stop member 104 of the valve stem pressing mechanism 101 presses the valve stem during the movable rod 83 is located at the radially outer utmost position.

When the annular member 6 is further rotated, the valve stem holding bore 14 holding therein the valve stem 13 comes into alignment with the piston rod 107 of the disengaging mechanism 105. When, in this instance, the detecting mechanism 82 detects that the valve core 44 is not completely screwed into the valve stem 13, the fluid pressure operated cylinder 40' is actuated so as to make the cam 41' to push down the roller 39 with the result that the locking rod 30 is lifted against the spring 29 as shown in FIG. 7. The fluid pressure operated cylinder 106 is then actuated to radially outwardly move the piston rod 107 which then pushes the valve stem 13, so that the valve stem 13 is removed from the valve stem holding bore 14. When, on the contrary, the valve core 44 is completely screwed into the valve stem 13, the disengaging mechanism 105 is not actuated and accordingly the valve stem 13 is held in the bore 14.

When the annular member 6 is further rotated, the valve stem holding bore 14 holding therein the valve stem 13 comes into alignment with the screw drive bit 112 of the first screwing mechanism 108. In this instance, the bit 112 is moved radially outwardly until the end of the bit 112 engages with the valve core 44 in the valve stem 13 and, thereafter, the bit 112 is driven by way of the powder clutch 111 by the servo motor 110 under a predetermined torque. Upon completion of the operation of the first screwing mechanism 108, the annular member 6 is further rotated so that the valve stem holding bore 14 comes into alignment with the bit 112 of the second screwing mechanism 109. The second screwing mechanism 109 operates to screw the valve core 44 into the valve stem 13 under a predetermined torque, whereby the valve core 44 is desiredly screwed into the valve stem 13. The valve stem pressing mechanisms 113 and 114, on the other hand, operate to prevent the valve stem 13 from loosing from the valve holding bore 14 during the operation of the first and second screwing mechanisms 108 and 109.

When the annular member 6 is further rotated, the valve holding bore 14 comes into alignment with the piston rod of the disengaging mechanism 115. The disengaging mechanism 115 includes a fixed cam corresponding to the cam 41' for pushing down the roller 39. The piston rod of the disengaging mechanism 115 then removes the valve stem 13 from the valve holding bore 14.

It will now be appreciated that the tire valve core mounting apparatus according to the invention is capable of consecutively mounting a plurality of valve cores into a plurality of valve stems. Further, it should be understood that when the valve core supplying and screwing mechanism 43 is sufficiently reliable in operation, the detecting mechanism 82, disengaging mechanism 105 and first and second screwing mechanisms 108 and 109 can be omitted. Furthermore, when the locking mechanism 26 is capable of fixedly lock the valve stem in the valve stem holding bore, the valve stem pressing mechanisms 78, 101, 113 and 114 may be omitted. It will be understood that the holding member 11 may be omitted and the valve stem holding bore 14 is formed in the annular member 6, if desired.

The detailed description of the preferred embodiment of the invention for the purpose of explaining the principles thereof is not to be considered as limiting or restricting the invention, as many modifications may be made by the exercise of skill in the art without departing from the scope and spirit of the invention.

What is claimed is:

1. A valve core mounting apparatus for successively mounting the valve core in the valve stem, which comprises:
   a fixed base member;
   a rotating base member adapted to be intermittently rotated through a constant angle with respect to said fixed base member;
   an annular member mounted on said rotating base member and having therein a plurality of valve stem holding bores being in circumferentially equidistant relation with respect to one another, each valve stem holding bore extending radially of said annular member;
   a plurality of locking mechanisms mounted on said annular member for preventing a valve stem held in one of said valve stem holding bores from loosing from said one of valve stem holding bores, each locking mechanism being associated with each valve holding bore;
   valve core supplying and screwing means mounted on said fixed base member for supplying a valve core to said valve stem per an angle of rotating of said annular member and for screwing said valve core into said valve stem; and
   first disengaging means mounted on said fixed base member and spaced in the rotation direction of said rotating base member from said valve core supplying and screwing means, for disengaging said valve stem from said one of the valve stem holding bores.

2. A valve core mounting apparatus as set forth in claim 1, in which said annular member has a plurality of subsidiary bores each axially extending therethrough from one side surface of said annular member to one of said valve stem holding bores, and in which each of said locking mechanisms includes a locking rod slidably accommodated in one of said subsidiary bores and biased by a spring toward said one of the valve stem holding bores.

3. A valve core mounting apparatus as set forth in claim 1, in which said valve core supplying and screwing means includes a valve core supplying tube extending radially of said annular member and radially of said annular member slidably mounted on said fixed base member, a valve core feeder mounted on said fixed base member for feeding a valve core into said valve core supplying tube per one rotation of said annular member, a screw drive bit support tube extending radially of said annular member and radially slidably mounted on said fixed base member, said screw drive bit support tubular member being partly connected with said valve core supplying tubular member, a screw drive bit slidably accommodated in said screw drive bit support tubular member, a driver connected to said screw drive bit for rotating said screw drive bit, and an actuator connected to said screw drive bit support tubular member and said screw drive bit for moving radially of said annular member said screw drive bit support tubular member and said screw drive bit.

4. A valve core mounting apparatus as set forth in claim 1, in which said annular member has a plurality of subsidiary bores each axially extending from one side surface of said annular member to one of said valve stem holding bores; and in which said locking mechanism includes a locking rod slidably accommodated in one of said subsidiary bores and biased by a spring toward said one of the valve stem holding bores, a bracket mounted on said annular member, a lever pivotally mounted at an intermediate portion thereof on said bracket and pivotally connected at one end thereof with said locking rod, and a roller rotatably mounted on the other end of said lever; and in which said disengaging means includes a cam member, a positioning mechanism mounted on said fixed base member for so positioning said cam member that said locking rod lifted against the spring away from said one of the valve stem holding bores when said roller engages with said cam member upon the rotation of said annular member, a cylinder assembly mounted on said fixed base member and having a piston rod extending radially of said annular member, said piston rod being in alignment with said one of the valve stem holding bores and inserted into said one of the valve stem holding bores by the actuation of said cylinder assembly.

5. A valve core mounting apparatus as set forth in claim 1, which further comprises:
   detecting means interposed between said valve core supplying and screwing means and said disengaging means, for detecting whether said valve core is correctly mounted in said valve stem; and
   second disengaging means interposed between said detecting means and said first disengaging means, for disengaging said valve stem from said one of the valve stem holding bores.

6. A valve core mounting apparatus as set forth in claim 5, in which said detecting means includes; a movable rod radially of said annular member movably mounted on said fixed base member and having therein an axially extending bore with one bottomed end, at least one radially extending bore establishing communication between said axially extending bore of the movable rod and the atmosphere, a second radially extending bore communicating with said axially extending bore, and a third radially extending bore communicating with said axially extending bore and being spaced from said second radially extending bore in the axial direction of said movable rod; a first source of compressed air communicating with said second radially extending bore; a first pressure switch communicated with said first source of compressed air and arranged to actuate when the compressed air from said first source of compressed air is applied thereto; a second source of compressed air communicating with said third radially extending bore; a second pressure switch communicating with said second source of compressed air and arranged to actuate when the compressed air from the second source of compressed air is applied thereto; a detecting rod hermetically accommodated in said axially extending bore of said movable rod.

7. A valve core mounting apparatus as set forth in claim 5, which further comprises:
   screwing means mounted on said fixed base member and interposed between said first and second disengaging means, for screwing said valve core into said valve stem.

8. A valve core mounting apparatus as set forth in claim 7, in which said screwing means includes a screw drive bit, and a driver connected by way of a clutch with said screw drive bit.

9. A valve core mounting apparatus as set forth in claim 1, which further comprises:
   suction means mounted on said fixed base member and spaced from said valve core supplying and screwing means in a direction opposite to the rotation direction of said annular member, for sucking the air through said valve stem.

10. A valve core mounting apparatus as set forth in claim 9, in which said suction means includes a suction hollow member mounted on said fixed base member and having a suction bore extending therethrough radially of said annular member, said suction hollow member having an outer arcuate end, urging means for urging said suction tubular member radially of said annular member so that said suction bore hermetically communicates with said one of the valve stem holding bore, and a suction pump communicating with said suction bore.

* * * * *